UNITED STATES PATENT OFFICE 2,399,024

PROCESS FOR OBTAINING 1,2-DICHLORO-1,1-DIFLUOROETHANE

Jesse Harmon, Wilmington, Del., assignor to E. I. du Pont de Nemours & Company, Wilmington, Del., a corporation of Delaware No Drawing. Application August 23, 1943, Serial No. 499,711

5 Claims. (Cl. 260—653)

This invention relates to chlorofluoroalkanes and more specifically to 1,2-dichloro-1,1-difluoroethane and to a process for its preparation.

This invention has as an object a new and improved process for the preparation of chlorofluoroethane and to a process for its preparation. This invention has as an object a new and improved process for the preparation of chlorofluoroalkanes. A further object is to provide a rapid, efficient and practicable process for the preparation of chlorofluoroethanes. Another object is to provide a rapid, efficient and practicable process for the preparation of 1,2-dichloro-1,1-difluoroethane. Other objects will appear hereinafter.

According to the process of this invention, 1,2-dichloro-1,1-difluoroethane is prepared by reacting trichloroethylene with hydrogen fluoride at elevated temperatures as more fully described hereinafter.

The preferred embodiments of the invention are illustrated by the following example in which proportions of reactants are given in parts by weight unless otherwise indicated:

A silver-lined high pressure reactor is charged with 150 parts of trichloroethylene. The reactor is closed and 150 parts of anhydrous hydrogen fluoride is admitted. The reaction mixture is heated while agitating at 199–204° C. for 9.5 hours. After cooling the reactor, the pressure is released through an ice-water scrubber; the tube is then opened and the liquid contents added to the scrubber liquid. The organic layer is repeatedly washed with water, then dried, and distilled through a precision still. Fifty-three parts of 1,2-dichloro-1,1-difluoroethane having a boiling point of 46° C. and a refractive index, $N_n^{20}$, of 1.3620 is obtained. (Henne and Hubbard. J. Am. Chem. Soc. 58, 404 (1936) record a refractive index, $N_n^{20}$, of 1.36193 and a boiling point of 46.8° C. for 1,2-dichloro-1,1-difluoroethane.)

It is to be understood that the process of this invention is capable of considerable variation. Thus, the temperatures employed in the operation of this process may vary from 100 to as high as 350° C. or higher, although, on account of the superior yields thereby obtained, the temperatures are preferably maintained within the range of 150–250° C. The upper temperature limit is that at which decomposition of the reactants and/or products occurs.

The ratio by weight of hydrogen fluoride to trichloroethylene may range from about 10:1 to 1:5. In general practice, however, it is preferable to keep the ratio between 2:1 and 1:2 since better results are obtained within this range.

Although the invention is illustrated by the reaction of trichloroethylene and anhydrous hydrogen fluoride it is within the scope of this invention to use aqueous solutions of hydrogen fluoride. In general, it is preferable to use anhydrous hydrogen fluoride since the reaction proceeds more smoothly therewith.

1,2-dichloro-1,1-difluoroethane is useful as an intermediate for the preparation of a large number of fluorine containing compounds. Thus, it can be converted to 1,1-difluoroethylene by treatment with zinc in alcohol. Similarly, by treating 1,2-dichloro-1,1-difluoroethane with alcoholic alkali, 2-chloro-1,1-difluoroethylene can be obtained. These fluoroolefins can be converted to resins by polymerization.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining 1,2-dichloro-1,1-difluoroethane which comprises heating a mixture consisting of trichloroethylene and hydrogen fluoride at a temperature within the range of 100° C. to 350° C.

2. The process according to claim 1 wherein the heating is effected at a temperature within the range of from about 150° C. to about 250° C.

3. The process according to claim 1 wherein the ratio by weight of hydrogen fluoride to trichloroethylene is within the range of from about 2:1 to about 1:2.

4. The process for obtaining 1,2-dichloro-1,1-difluoroethane which comprises heating a mixture consisting of trichloroethylene and anhydrous hydrogen fluoride at a temperature within the range of from about 150° C. to 250° C., the ratio by weight of hydrogen fluoride to trichloroethylene being within the range of from about 2:1 to 1:2.

5. The process according to claim 4 wherein the heating is effected at a temperature of about 200° C.

JESSE HARMON.